*I. Adams,*
*Steam Cut-Off.*
Nº 744. Patented May 17, 1838.
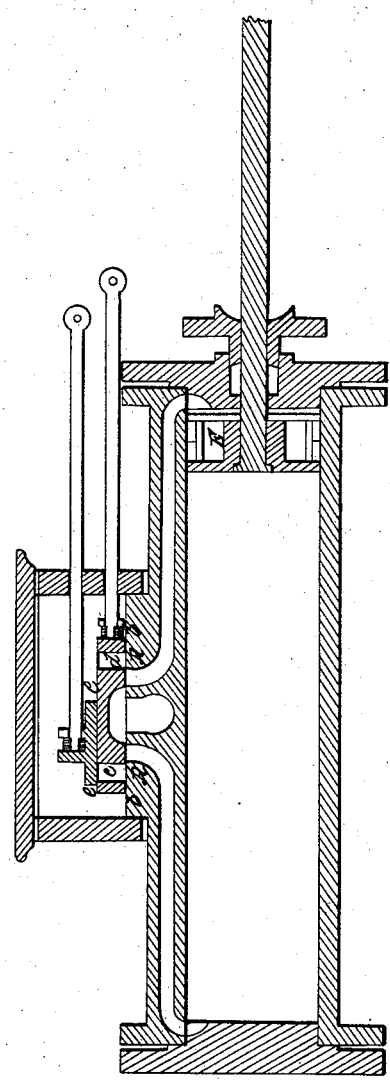

UNITED STATES PATENT OFFICE.

ISAAC ADAMS, OF BOSTON, MASSACHUSETTS.

MODE OF CUTTING OFF STEAM IN STEAM-ENGINES.

Specification of Letters Patent No. 744, dated May 17, 1838.

*To all whom it may concern:*

Be it known that I, ISAAC ADAMS, of Boston, in the county of Suffolk and State of Massachusetts, have invented a new Mode of Cutting Off Steam in Steam-Engines for the Purpose of Working it Expansively.

The following is a true description of my said invention in my own words.

My said invention consists in an addition to each end of the common slide valve in such manner as to form apertures through which the steam must pass in entering the cylinder; these apertures agree in dimensions with the induction apertures in the valve seat, (this valve I shall call the slide valve,) and furnishing the outer surface of the slide valve with a sliding plate, or plain slide valve, which I shall call the cut off valve; the two valves are operated by two eccentrics, the one which operates the cut off valve being placed on the shaft with its most eccentric part in advance, in the direction of its motion, of the most eccentric point of the eccentric which operates the slide valve, so that the cut off valve is always brought to either extreme of its motion before the slide valve, and consequently returns in season to cover the aperture through the opposite end of the slide valve, and thus cut off the communication between the steam chest and the interior of the cylinder at a half stroke, more or less, this circumstance being governed by the relative position of the two eccentrics in their orbit of rotation.

The communication between the steam chest and the interior of the cylinder being thus cut off, the steam already in the cylinder will exert its expansive force on the piston until it has reached one extreme of its motion, when the steam is allowed to escape from the cylinder as usual, and so on alternately. The power thus gained is the object of this invention.

The above drawing is a section of a steam cylinder and steam chest furnished with the valves.

A, A, is a section of the common slide valve, having additions from A, to *b*, at each end forming the apertures *c*, *d*, through which the steam must pass into the cylinder.

*e, e,* is a section of the cut off valve; both of these valves are operated with eccentrics in the manner of common slide valves.

The mode of operation is as follows: When the piston E, has arrived at the place shown in the drawing, the eccentric which operates the slide valve (A, A,) being adjusted in the same manner as in the common steam engine, and the eccentric which operates the cut off valve being set more or less in advance of the other eccentric in the direction of its motion, the cut off valve will have arrived at one extremity of its motion at about the same time the slide valve will have received one half its motion in the same direction; both valves will therefore now move in opposite directions, and the cut off valve will be brought over the aperture *d*, and thus cut off the communication to the cylinder by the time the piston has passed one half the length, (more or less,) of its stroke. The cylinder being thus half filled with steam and the communication between it and the steam chest being cut off, the remaining movement of the piston to the completion of the stroke will be effected by the steam's expansive force. The completion of a revolution of the crank will produce the same movement of the valves in the opposite direction, so that the steam will be let in, and cut off, and expand in the same manner alternately at both ends of the cylinder. The steam may be cut off at almost any portion of the stroke desired by reversing the cut off eccentric more or less forward of the slide valve eccentric.

I claim—

1. The combination with steam engines, of the slide valve having apertures, constructed and operating as above described, and also the combination of the cut off valve with the slide valve as above described and set forth; the purpose of the apparatus claimed being the working of steam expansively in a more complete and advantageous way than has been heretofore practised.

2. I also claim the mode above described of giving the proper motion to the valves, viz. placing the cut off eccentric in advance of the slide valve eccentric as above described.

ISAAC ADAMS.

Witnesses:
JUDSON HARDING,
OWEN ELLIS.